(12) United States Patent
Nagge et al.

(10) Patent No.: US 12,012,837 B2
(45) Date of Patent: Jun. 18, 2024

(54) DESANDING WELLHEAD

(71) Applicant: ENERCORP ENGINEERED SOLUTIONS INC., Calgary (CA)

(72) Inventors: Rory Nagge, Calgary (CA); James Pung, Calgary (CA)

(73) Assignee: ENERCORP ENGINEERED SOLUTIONS INC., Calgary (CA)

( * ) Notice: Subject to any disclaimer, the term of this patent is extended or adjusted under 35 U.S.C. 154(b) by 167 days.

(21) Appl. No.: 17/704,241

(22) Filed: Mar. 25, 2022

(65) Prior Publication Data

US 2022/0307363 A1     Sep. 29, 2022

Related U.S. Application Data

(60) Provisional application No. 63/166,024, filed on Mar. 25, 2021.

(51) Int. Cl.
| | |
|---|---|
| *E21B 43/34* | (2006.01) |
| *B01D 21/26* | (2006.01) |
| *B04C 3/04* | (2006.01) |
| *B04C 5/24* | (2006.01) |
| *E21B 33/03* | (2006.01) |

(52) U.S. Cl.
CPC ............ *E21B 43/35* (2020.05); *B01D 21/267* (2013.01); *E21B 33/03* (2013.01); *B04C 3/04* (2013.01); *B04C 5/24* (2013.01)

(58) Field of Classification Search
CPC ....... E21B 43/35; E21B 33/03; B01D 21/267; B04C 3/04; B04C 5/24
See application file for complete search history.

(56) References Cited

U.S. PATENT DOCUMENTS

| | | | |
|---|---|---|---|
| 10,625,274 B2 | 4/2020 | Spiridonov et al. | |
| 10,953,411 B2 | 3/2021 | Bowley | |
| 11,293,240 B2 | 4/2022 | Morin et al. | |
| 11,707,702 B2 | 7/2023 | Coombe et al. | |
| 2014/0116948 A1* | 5/2014 | Meyer | E21B 43/2607 166/308.1 |
| 2020/0141221 A1* | 5/2020 | Malone | B01D 17/00 |
| 2021/0178405 A1 | 6/2021 | Bowley | |
| 2021/0363029 A1* | 11/2021 | Johns | B01D 21/302 |

* cited by examiner

*Primary Examiner* — Crystal J Lee
(74) *Attorney, Agent, or Firm* — MH2 TECHNOLOGY LAW GROUP, LLP

(57) ABSTRACT

A desanding wellhead includes a wellhead device in communication with a well and configured to receive a mixed fluid produced therefrom, and a sand separation device coupled to the wellhead device. The sand separation device is configured to receive fluid from the well via the wellhead device, separate at least some solids from the fluid, and provide at least some of the fluid back to the wellhead device.

17 Claims, 5 Drawing Sheets

DESANDING WELLHEAD

CROSS-REFERENCE TO RELATED APPLICATIONS

This application claims priority to U.S. Provisional Patent Application having Ser. No. 63/166,024, which was filed on Mar. 25, 2021 and is incorporated herein by reference in its entirety.

BACKGROUND

Hydraulic fracturing is a well-treatment process in which preferential flowpaths for hydrocarbons are established in a subterranean rock formation by pumping a fluid at high pressures into a well to initiate fractures in the rock formation. The fluid is predominately water, but may also include solids, such as sand or ceramic proppants, which at least partially fill the fractures and maintain the preferential flowpaths.

When oil or other fluids are produced/recovered from the well, it may be desirable to remove sand or other solids from the produced fluid. Typically, a separator system is used, which may include one or more separation devices (e.g., cyclonic separators), filters, screens, tanks, etc. The separator system is generally connected to a wellhead via pipes or tubing. The fluid thus flows from well, into the wellhead, and then to the separator system, where the solids are separated out. The solids may be stored in a tank and periodically removed, while the fluids may be further separated (e.g., to separate hydrocarbons from water). Recovered hydrocarbons may be stored or otherwise transported for sale, and recovered water may be stored or otherwise recirculated for use in the well.

SUMMARY

Embodiments of the disclosure include a desanding wellhead having a wellhead device in communication with a well and configured to receive a mixed fluid produced therefrom, and a sand separation device coupled to the wellhead device. The sand separation device is configured to receive fluid from the well via the wellhead device, separate at least some solids from the fluid, and provide at least some of the fluid back to the wellhead device.

Embodiments of the disclosure also include a desanding wellhead having a wellhead device including a lower portion coupled to a well and configured to receive a mixed fluid produced therefrom, and an upper portion coupled to a wellhead outlet and configured to provide a separated fluid thereto. The desanding wellhead also has one or more separators coupled to the wellhead device and physically supported thereby, the one or more separators being configured to receive the mixed fluid from the lower portion of the wellhead device, separate at least some solids from the mixed fluid to generate at least some of the separated fluid, and provide the separated fluid generated thereby to the upper portion of the wellhead device.

Embodiments of the disclosure may further include a method including connecting a plurality of separators to a wellhead device including an inlet pipe that is connected to a well, such that the plurality of separators are at least partially supported from a ground by connection to the wellhead device, receiving a mixed fluid into the wellhead device from the well, receiving the mixed fluid into the plurality of separators from the wellhead device, separating the mixed fluid into a fluid portion and a solids portion using the plurality of separators, receiving the fluid portion back into the wellhead device, wherein the fluid portion is prevented from mixing with the mixed fluid received from the well, and receiving the solids portion into a sand storage tank.

BRIEF DESCRIPTION OF THE DRAWINGS

The present disclosure may best be understood by referring to the following description and the accompanying drawings that are used to illustrate embodiments of the invention. In the drawings.

DETAILED DESCRIPTION

Figure 1:
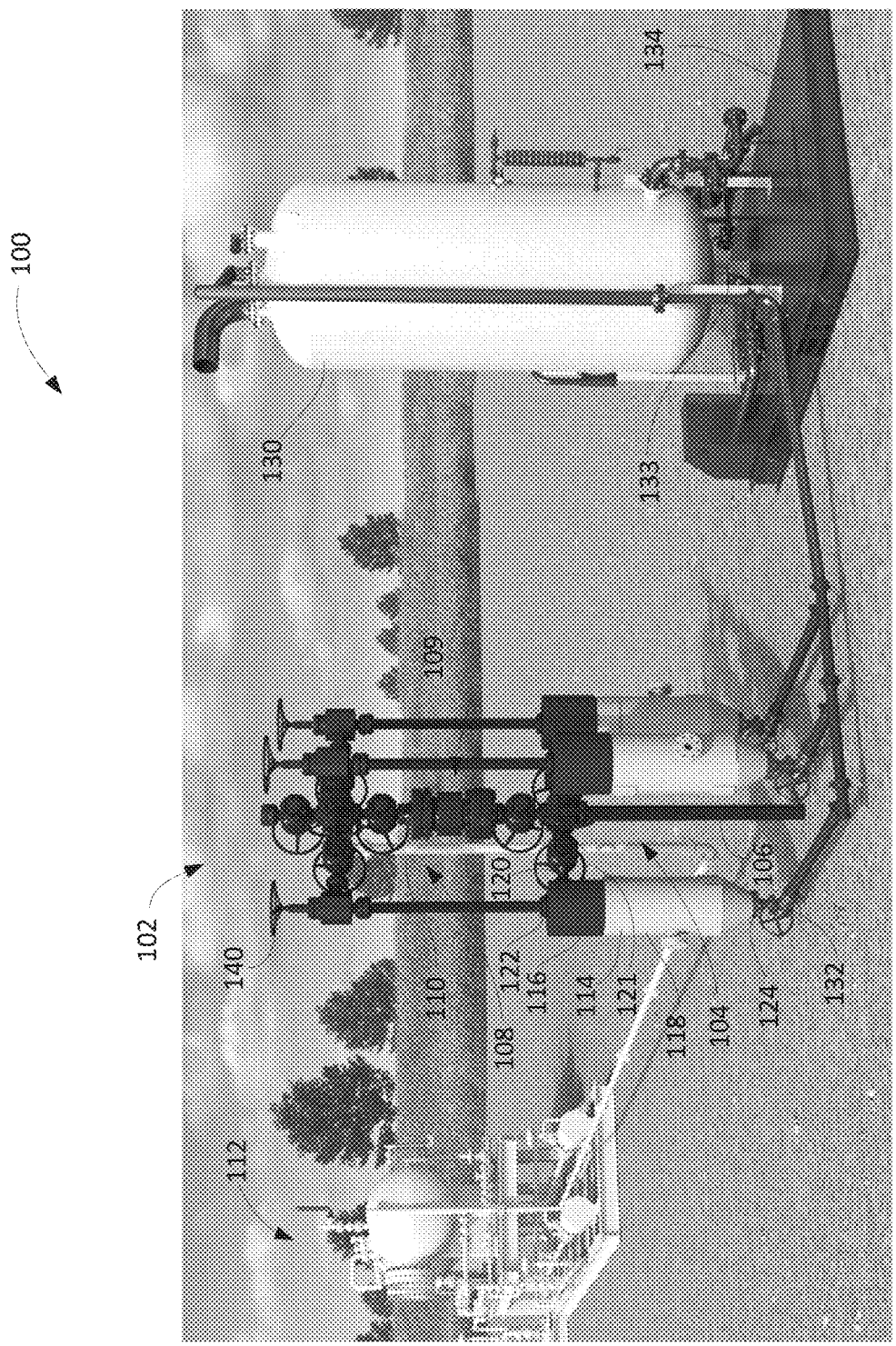
FIG. 1 illustrates a perspective view of a desanding wellhead, according to an embodiment.

The following disclosure describes several embodiments for implementing different features, structures, or functions of the invention. Embodiments of components, arrangements, and configurations are described below to simplify the present disclosure; however, these embodiments are provided merely as examples and are not intended to limit the scope of the invention. Additionally, the present disclosure may repeat reference characters (e.g., numerals) and/or letters in the various embodiments and across the Figures provided herein. This repetition is for the purpose of simplicity and clarity and does not in itself dictate a relationship between the various embodiments and/or configurations discussed in the Figures. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact. Finally, the embodiments presented below may be combined in any combination of ways, e.g., any element from one exemplary embodiment may be used in any other exemplary embodiment, without departing from the scope of the disclosure.

Additionally, certain terms are used throughout the following description and claims to refer to particular components. As one skilled in the art will appreciate, various entities may refer to the same component by different names, and as such, the naming convention for the elements described herein is not intended to limit the scope of the invention, unless otherwise specifically defined herein. Further, the naming convention used herein is not intended to distinguish between components that differ in name but not function. Additionally, in the following discussion and in the claims, the terms "including" and "comprising" are used in an open-ended fashion, and thus should be interpreted to mean "including, but not limited to." All numerical values in this disclosure may be exact or approximate values unless otherwise specifically stated. Accordingly, various embodiments of the disclosure may deviate from the numbers, values, and ranges disclosed herein without departing from the intended scope. In addition, unless otherwise provided herein, "or" statements are intended to be non-exclusive; for example, the statement "A or B" should be considered to mean "A, B, or both A and B."

Embodiments of the present disclosure may provide a desanding wellhead, that is, a wellhead device with an integrated desanding system. The desanding wellhead may eliminate flowback, provide lower velocity separation by separating prior to at least some system chokes, and may be configured for more permanent installation at a wellhead, as compared to a conventional wellhead and separate sand separation system. In such a desanding wellhead, at least a portion of the separation devices are physically coupled to and/or supported by the wellhead equipment. Furthermore, both the inlet and the outlet of the separation devices may communicate with the wellhead equipment, such that separate pipes between the wellhead equipment and the separation device are avoided. It will be appreciated that the foregoing are not to be considered limiting or otherwise requirements for every embodiment within the scope of the present disclosure, but rather aspects of some of the embodiments disclosed herein.

Turning now to the specific, illustrated embodiments, FIG. 1 illustrates a perspective view of a desanding wellhead 100, according to an embodiment. Although the solids being separated in this desanding wellhead 100 are generally described as being sand, it will be appreciated that the desanding wellhead 100 may separate other types of solids, as well, and thus the description of sand is not to be considered limiting and may encompass any type of particulate solids matter. The desanding wellhead 100 may include a wellhead device 102. The wellhead device 102 includes a lower portion 104 that includes an inlet (e.g., a vertically-extending inlet pipe) 106 coupled to the top of a subterranean well. The inlet 106 may be configured to receive fluids from the well and may thus be in (e.g., direct) fluid communication therewith.

The wellhead device 102 may also include an upper portion 108 including a wellhead outlet 110 that may communicate with a secondary separator 112 (e.g., a separator skid). The upper portion 108 may be prevented from directly communicating with the inlet 106. The secondary separator 112 may include sedimentation tanks, filters, screens, etc. configured to remove relatively small particles from fluid recovered from the well. Between the lower and upper portions 104, 108 there may be positioned one or more flanges and/or flow-control device such as valves (e.g., one or more master valves) 109.

The desanding wellhead 100 may further include one or more separators 114 that are physically coupled to the wellhead device 102 and thus integrated therewith. In an embodiment, the one or more separators 114 may be physically supported at least partially by connection with the wellhead device 102, e.g., such that the weight of the separator(s) 114 is transferred to the ground via the inlet pipe 106. Further, the separators 114 may be positioned at (e.g., uniform) angular intervals around the inlet pipe 106.

The separators 114 may be, for example, cyclonic separators, although other types of separators may be employed without limitation. An example of a cyclonic separator, according to a specific embodiment, is described in U.S. Pat. No. 10,953,411, which is incorporated herein by reference to the extent not inconsistent with the present disclosure. Further, although three separators 114 are shown, it will be appreciated that any number of one or more separators 114 may be used. For example, several separators may be employed, e.g., in parallel, with each separator 114 being configured to receive fluid produced from a different well, two or more being configured to receive fluid produce from a single well, in parallel or in series, in any arrangement. U.S. Patent Publication No. 2021/0205735, which is incorporated herein by reference to the extent not inconsistent with the present disclosure, provides an example of such a multi-separator system. Moreover, as discussed and described therein, one or more controllers may be provided to control operation, blowdown (as described below), and/or various other aspects of operation.

Returning to FIG. 1, the separators 114 each include a separation chamber 116 and a collection chamber 118. Further, the separators 114 include an inlet 120 and a fluid outlet 122 and a solids outlet 124. The inlet 120 may be configured to receive a mixed fluid (e.g., sand/solids and one or more fluids) from the wellhead device 102. Further, the inlet 120 communicates the mixed fluid to the separation chamber 116. The flow of mixed fluid may be controlled between the wellhead device 102 and each of the separators 114 using one or more inlet valves 121, e.g., to enable isolation of the individual separators 114 and provide for maintenance thereof. In the separation chamber 116, solids may be at least partially separated from the fluids. The solids may drop into the collection chamber 118, while the fluids may flow up through the fluid outlet 122.

The desanding wellhead 100 may also include a sand storage tank 130. Although referred to as a "sand" storage tank herein, it will be appreciated that the tank 130 may contain other types of (e.g., particulate) solids. The sand storage tank 130 may be in communication with the solids outlet 124 of each of the separators 114. Further, one or more valves 132 at the solids outlets 124 of the separators 114 may control the release of solids via the solids outlet 124 into the sand storage tank 130. Thus, sand may be periodically removed ("blown down") from the collection chamber 118 of the separator 114 through the solids outlet 124 and into the sand storage tank 130.

The sand storage tank 130 may include a blowdown outlet 133. Periodically, e.g., as the sand storage tank 130 fills up, the sand storage tank 130 may be emptied ("blown down") via the blowdown outlet 133, e.g., into a vacuum truck or another structure or device for removal of the sand or other solids. Additionally, the stand storage tank 130 may include a scale 134, which may weigh the sand storage tank 130, such that an estimate of the volume of sand that is within the tank 130 may be calculated, thereby providing information as to the remaining capacity of the sand storage tank 130.

In at least some embodiments, as described in U.S. Patent Publication No. 2019/0374879, the contents of which are incorporated herein by reference to extent not inconsistent with the present disclosure, a system may be implemented to determine when to blowdown the sand storage tank 130 and for how long. Accordingly, in at least some embodiments, various level switches, washing systems, and measurements may be implemented, both to provide efficient blowdown timing and also to quantify sand production. Further, in at least some embodiments, a sand quantification unit may be provided, which may be configure to precisely determine sand production and, e.g., use this information to further refine blowdown initiation and duration. An example of a sand quantification unit is provided in U.S. Patent Publication No. 2021/0131256, which is incorporated herein by reference to the extent not inconsistent with the present disclosure.

Returning to the separators 114, as mentioned above, the fluid separated from the sand therein may proceed via the fluid outlet 122 and back into the wellhead device 102, but may not comingle with the mixed fluid received directly from the well in the inlet 106. In particular, the fluid may flow from the separator fluid outlet 122 into the upper portion 108. One or more outlet valves 140 may be positioned between the separator fluid outlet 122 and the upper portion 108, and may be employed, e.g., to isolate an individual one of the separators 114. This may allow for taking the separators 114 offline, individually, e.g., for maintenance purposes.

The fluid flowing back into the wellhead device 102 from the separator fluid outlet 122 may then be provided to the outlet 110. As mentioned above, fluid at the outlet 110 may be directed to the secondary separator 112 for further processing.

Figure 2:
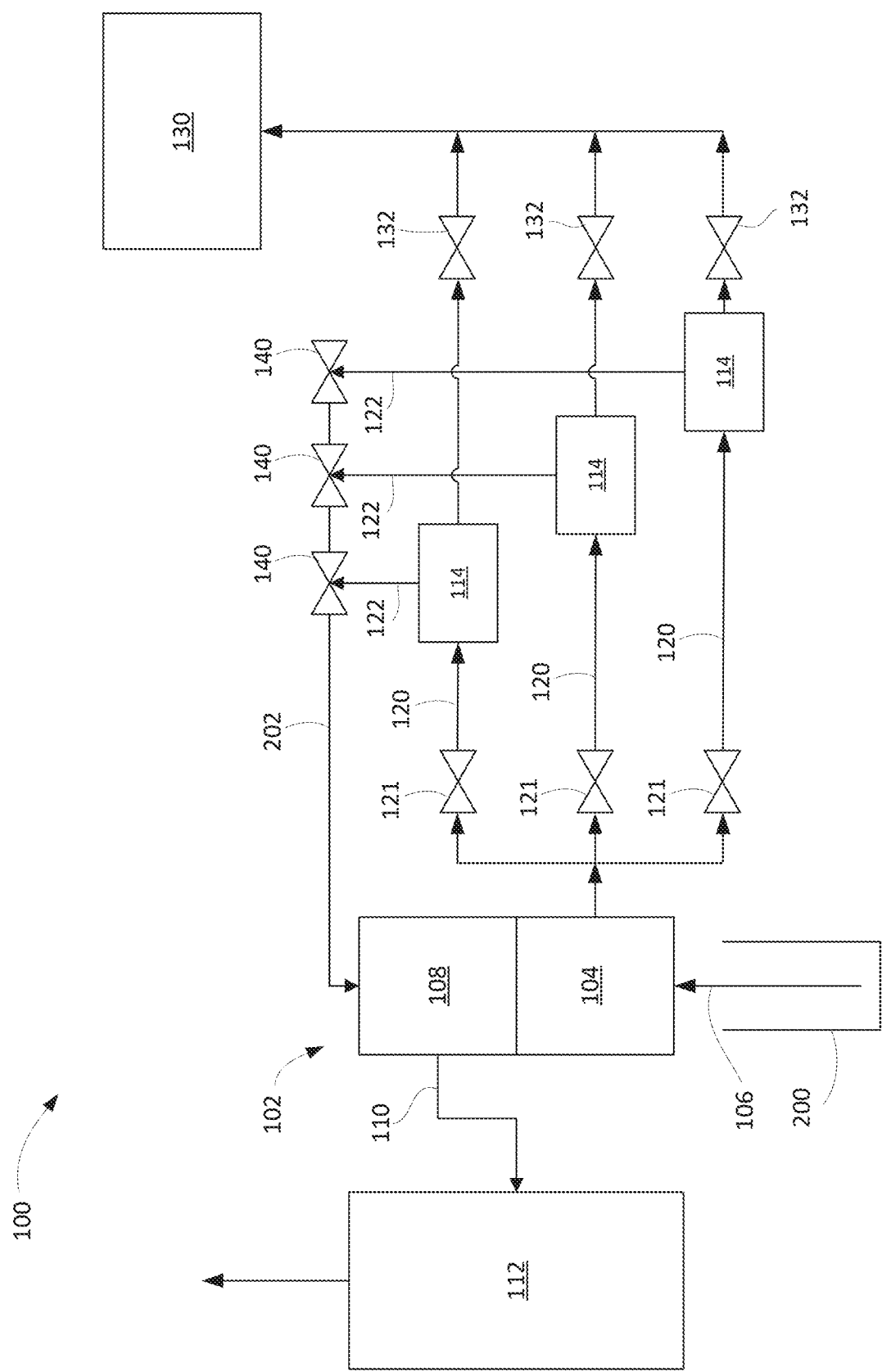
FIG. 2 illustrates a simplified, schematic view of the desanding wellhead, according to an embodiment.

FIG. 2 illustrates a simplified, schematic view of the desanding wellhead 100, according to an embodiment. As shown, the lower portion 104 of the wellhead device 102 is in communication with a well 200 via the inlet 106. In some embodiments, the wellhead device 102 may also be used to inject fluid into the well 200, but in other embodiments, other equipment may be used.

Proceeding through the flowpath provided by the desanding wellhead 100, the mixed fluid from the well 200 may be received into the lower portion 104 of the wellhead device 102, and then passed to the separators 114. The valves 121 may selectively route the mixed fluid to the separator inlets 120. The fluid separated from the mixed fluid in the separator 114 may be fed through the outlet 122. A wellhead return line 202, which may be a conduit, manifold, pipe, etc., may receive the fluid from the fluid outlet 122, e.g., via the valves 141. The wellhead return line 202 may feed the separated fluid back to the wellhead device 102, e.g., the upper portion 108 thereof. The wellhead device 102 may then feed the separated fluid to the secondary separator 112 for further processing, storage, recirculation into the well 200, etc.

Further, sand that is separated from the mixed fluid in the separator 114 may be provided to the sand storage tank 130 via the valves 132. The sand in the sand storage tank 130 may periodically be emptied.

Figure 3:
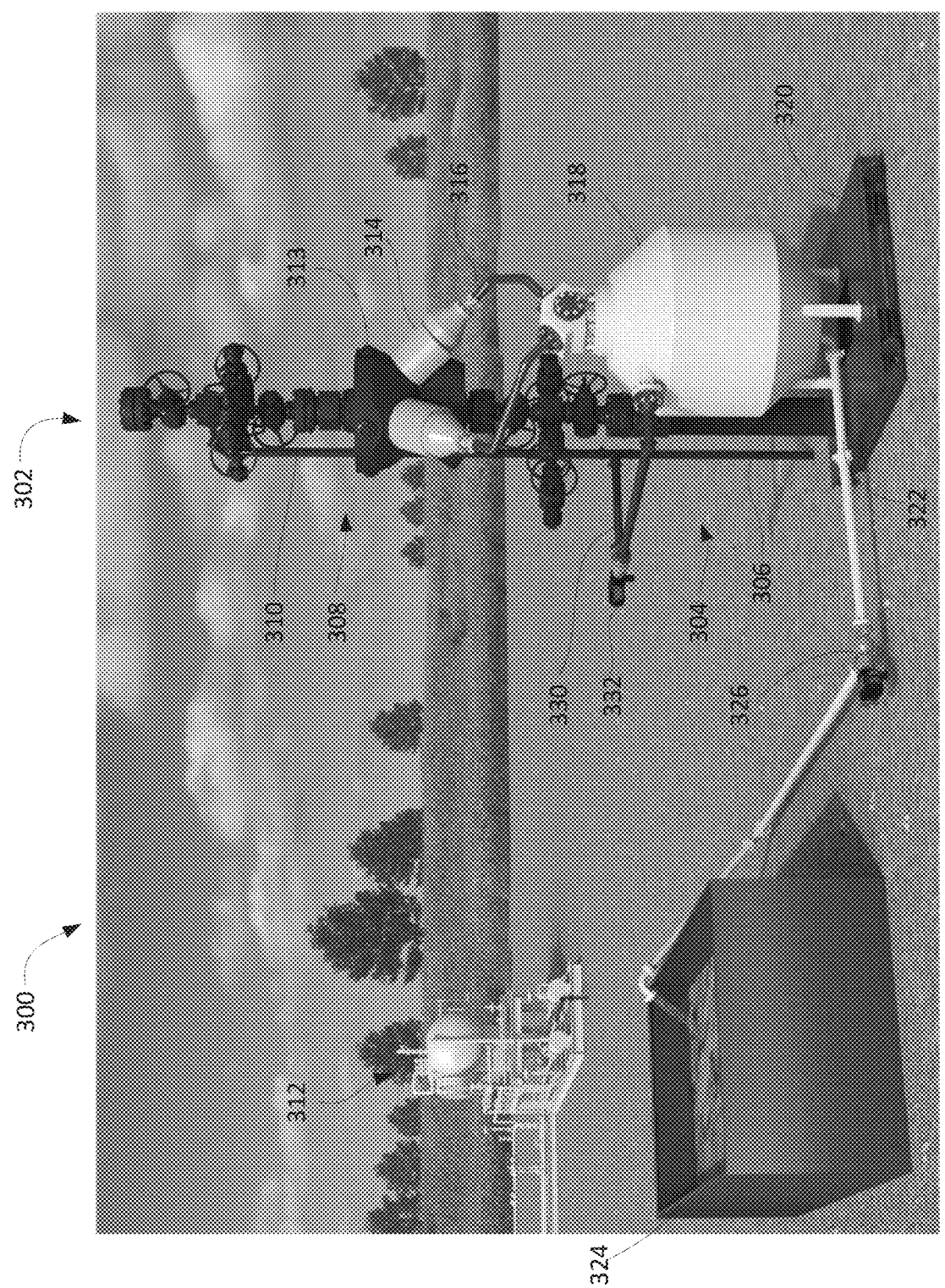
FIG. 3 illustrates a perspective view of another desanding wellhead, according to an embodiment.

FIG. 3 illustrates a perspective view of another desanding wellhead 300, according to an embodiment. The desanding wellhead 300 may include a wellhead device 302 having a lower portion 304 with an inlet (e.g., inlet pipe) 306 in communication with a well, and an upper portion 308 with an outlet 310 in communication with a separator skid 312, as discussed above with respect to FIG. 1. Additionally, the wellhead device 302 may include a manifold, such as a flow cross or "goat head" 313. The manifold 313 may form the interface between the upper portion 308 and the lower portion 304. The manifold 313 may connect to one or more separators 314 (two shown, by way of example). In particular, the manifold 313 may connect to both an inlet and a fluid outlet of the separators 314, as will be described in greater detail below. In other embodiments, separate connections, rather than a manifold 313, may be employed. The manifold 313 may provide a physical connection with the separators 314, such that the separators 314 are supported from the ground at least partially by the wellhead device 302.

The separators 314 may each provide a cyclonic separator; however, the separators 314 may not have a collection chamber. The separators 314 may include a solids outlet 316, which may be in communication with a sand storage tank 318. In some embodiments, the sand storage tank 318 may be positioned on a scale 320, such that a weight of the sand storage tank 318 may provide an approximation of the remaining capacity thereof during operation. The sand storage tank 318 may have an outlet 322, which may connect to a pit or trough 324, e.g., via one or more valves 326. In other embodiments, the sand storage tank 318 may be configured to couple to a vacuum truck or another structure so as to allow removal of the solids therein. Although referred to as a "sand" storage tank herein, it will be appreciated that the tank 318 may contain other types of (e.g., particulate) solids.

The sand storage tank 318 may additionally be connected to the outlet 310 of the wellhead device 302 via a bypass line 330. One or more chokes 332 may be positioned in the bypass line 330. The bypass line 330 may communicate with the sand storage tank 318 proximal to the top thereof, such that predominately fluids are received from the sand storage tank 318 into the bypass line 330. The bypass line 330 may allow for a fluid circuit to be created that includes the sand storage tank 318, thereby providing for a generally continuous, downward flow of fluid, along with the sand, from the separators 314 into the sand storage tank 318. As such, as mentioned above, the separators 314 may not include the collection chamber, but rather allow a slurry of sand and some of the fluid to generally continuously flow to the sand storage tank 318.

Referring again to the separator 314, as mentioned above, the separator 314 may have a fluid outlet that is coupled to the manifold 313. As such, at least a portion of the fluid that is separated from the solids in the separator 314 may flow back through the manifold 313 and into the well device 302. Thereafter, the fluid may flow through the upper portion 304 of the well device 302, e.g. via one or more valves, until reaching the outlet 310. In the outlet 310, the separated fluid may combine with fluid from the storage tank 318, and then proceed to the separator skid 312.

Figure 4:
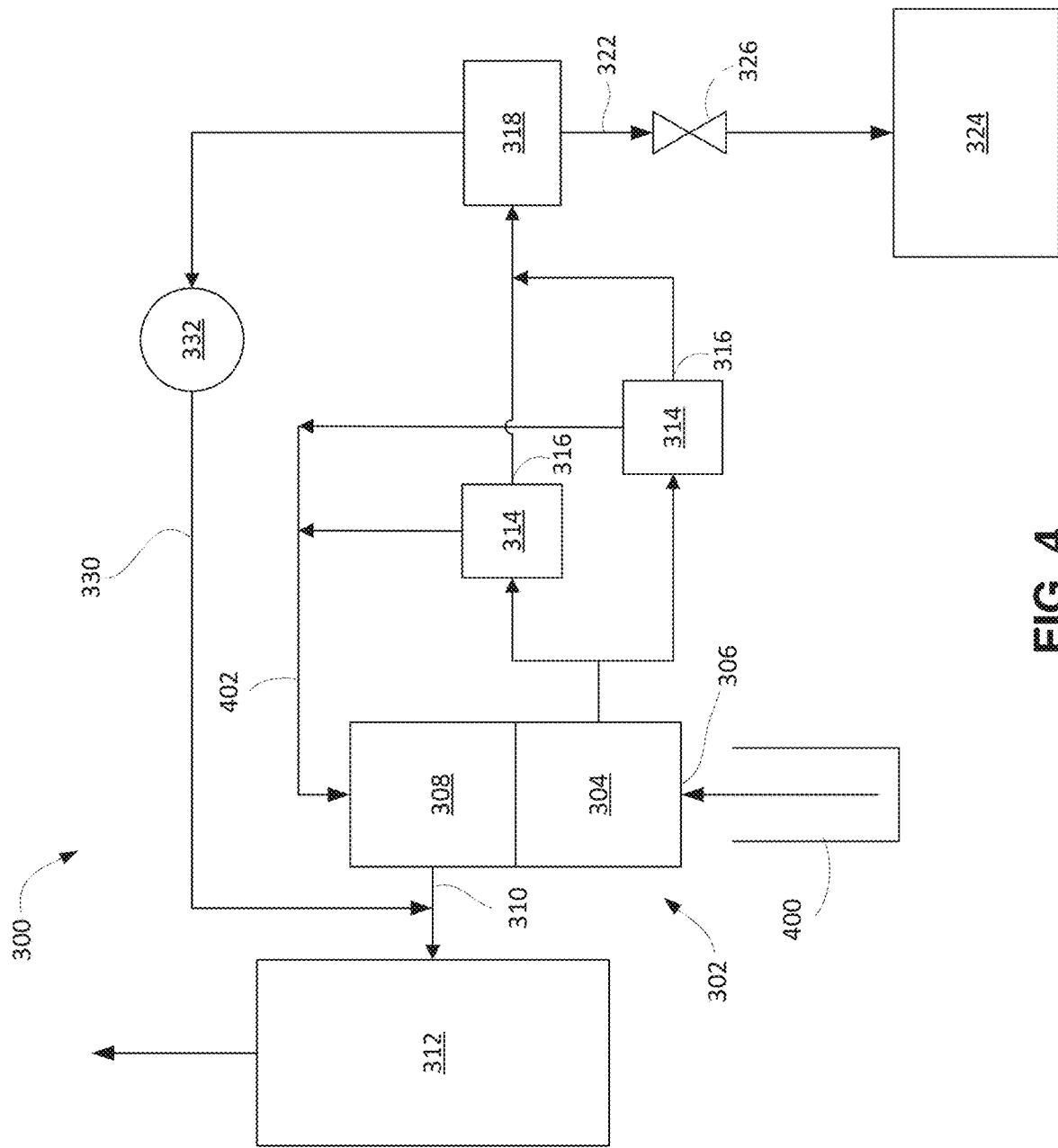
FIG. 4 illustrates a simplified, schematic view of the desanding wellhead of FIG. 3, according to an embodiment.

FIG. 4 illustrates a simplified, schematic view of the desanding wellhead 300, according to an embodiment. As mentioned above with respect to FIG. 3, the wellhead device 302 may be configured to receive fluid from (and/or provide fluid to) a well 400. The fluid from the well 400 may proceed through the lower portion 304 to the separators 314 (e.g., via the manifold 313 shown in FIG. 3 and/or via one or more isolation valves). The separators 314 may separate at least some of the fluid from the solids entrained in the fluid received from the well 400. Accordingly, the fluid may be directed to the upper portion 308 of the wellhead device 102 via a wellhead return line 402 extending from the separator(s) 314 to the upper portion 308. The fluid in the upper portion 308 may then be directed to the separator skid 312 via the outlet 310.

The sand, along with some of the fluid, separated in the separators 314 may be directed to the sand storage tank 318. At least some of the fluid directed to the sand storage tank 318 may be recovered via a bypass line 330 that extends to the outlet 310. In some embodiments, the bypass line 330 may extend back to the wellhead 102, e.g., the upper portion 308, or may connect to the wellhead return line 402. As mentioned above, the bypass line 330 may include a choke 332. Sand (or other solids) may be periodically removed from the sand storage tank 318 to the pit 324 via the blowdown outlet 322, e.g., by opening the valve 326.

Figure 5:
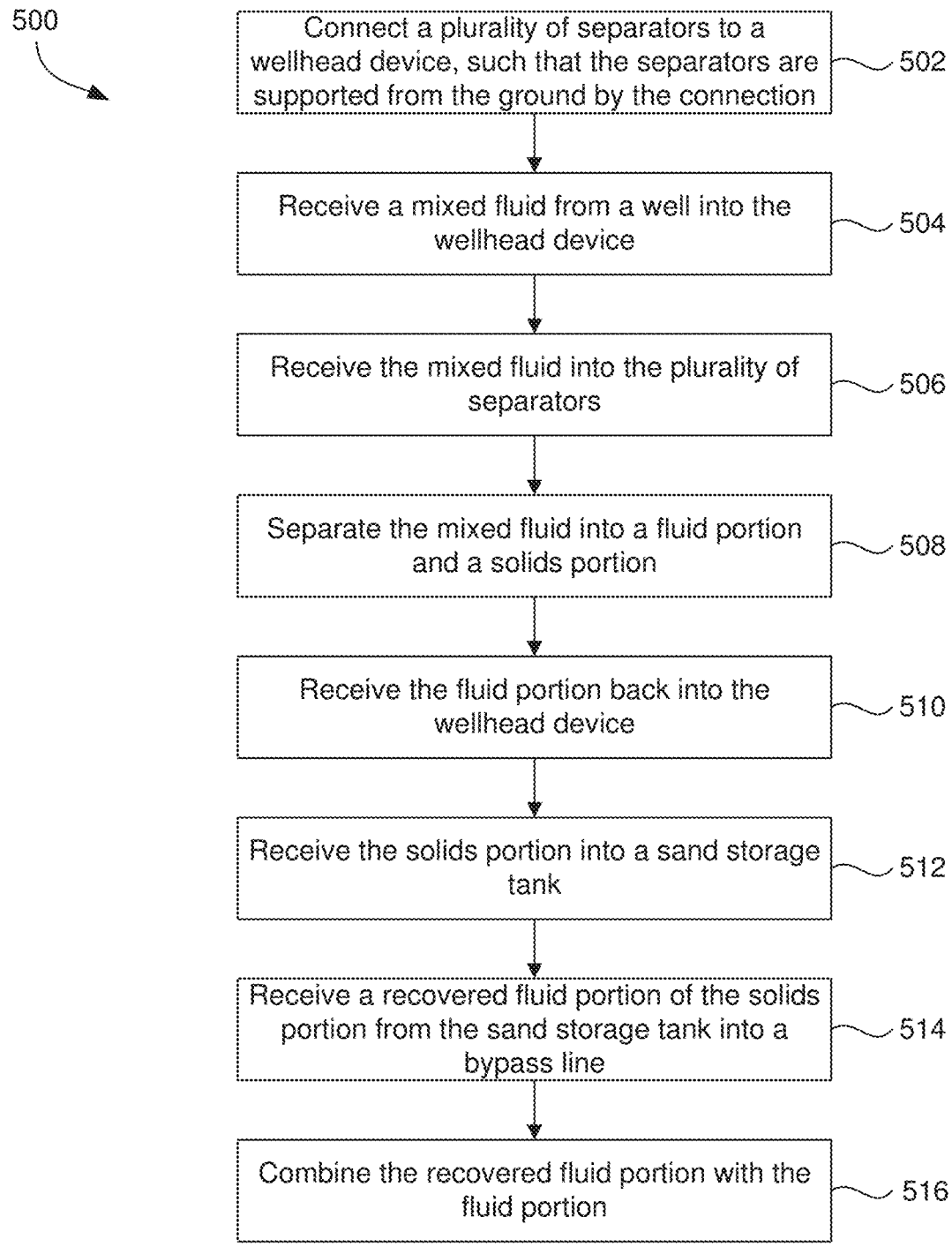
FIG. 5 illustrates a flowchart of a method for handling a mixed fluid produced from a well, according to an embodiment.

FIG. 5 illustrates a flowchart of a method 500 for handling a mixed fluid produced from a well, according to an embodiment. As noted above, the mixed fluid may contain a fluid portion and a solids portion (e.g., sand, although other particulate materials could be included). The method 500 may be executed using one or more embodiments of the desanding wellhead 100 and/or 300. As a matter of convenience, the method 500 is described herein with reference to the desanding wellhead 300. However, it will be appreciated that the method 500 may be executed using other structures/devices, and thus is not limited to any particular structure or device unless otherwise stated herein. Moreover, the steps of the method 500 may be conducted in the order presented, or in any other order, performed in parallel, in sequence, simultaneously, combined, or separated, without departing from the scope of the present disclosure.

The method 500 may include connecting a plurality of separators 314 to a wellhead device 302 including an inlet pipe 306 that is connected to a well, as at 502. The plurality of separators 314 may be at least partially supported from a ground by connection to the wellhead device 302, as described above.

The method 500 may also include receiving a mixed fluid into the wellhead device 302 from the well, as at 504. For example, the mixed fluid may be received through the inlet pipe 306 in a lower portion 304 of the wellhead device 302.

The method 500 may also include receiving the mixed fluid from the wellhead device 302 into the plurality of separators 314, as at 506. For example, the mixed fluid may be received into two or more of the separators 314 at the same time, e.g., in parallel.

The method 500 may also include separating the mixed fluid into a fluid portion and a solids portion using the plurality of separators 314, as at 508. As noted above, the separators 314 may be cyclonic separators, but in other embodiments, may be other types of separators.

The method 500 may include receiving the fluid portion back into the wellhead device 302, as at 510. The fluid portion is prevented from mixing with the mixed fluid received from the well by the wellhead device 302. For example, the fluid portion may be received into an upper portion 308 of the wellhead device 302, which may be prevented from communicating directly with the well and/or with the lower portion 304. As such, the mixed fluid is routed to the separators 314, and the fluid portion after separation is routed, e.g., to an outlet 310 of the wellhead device 302. It will be appreciated that the fluid portion may include some sand or other solids, but in a reduced concentration from the mixed fluid.

The solids portion may be received into a sand storage tank 318, as at 512. In some embodiments, a single sand storage tank 318 may be provided, or each of the separators 314 may feed a separate sand storage tank. In some embodiments, the separators 314 may provide the sand to the sand storage tank 318 continuously, as separation operations proceed. In other embodiments, the solids portion may be temporarily held in a collection chamber (e.g., chamber 118, discussed above with reference to FIG. 1), which may be emptied periodically.

The solids portion may be provided as a slurry, which includes some fluid from the mixed fluid. The slurry may be provided to the sand storage tank 318, which may permit the solids to fall to the bottom of the sand storage tank 318. The fluid separated from the solids in the sand storage tank 318 may then be received or "recovered" as a "recovered" fluid and received into a bypass line 330, as at 514. The recovered fluid in the bypass line may then be combined (e.g., in the upper portion 308 of the wellhead device 302 or downstream therefrom, e.g., at or downstream of the outlet 310) with the fluid portion that was separated from the mixed fluid by the separators 314, as at 516.

As used herein, the terms "inner" and "outer"; "up" and "down"; "upper" and "lower"; "upward" and "downward"; "above" and "below"; "inward" and "outward"; "uphole" and "downhole"; and other like terms as used herein refer to relative positions to one another and are not intended to denote a particular direction or spatial orientation. The terms "couple," "coupled," "connect," "connection," "connected," "in connection with," and "connecting" refer to "in direct connection with" or "in connection with via one or more intermediate elements or members."

The foregoing has outlined features of several embodiments so that those skilled in the art may better understand the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A desanding wellhead, comprising:
   a wellhead device comprising a lower portion that is in communication with a well and configured to receive a mixed fluid produced therefrom, wherein the wellhead device also comprises an upper portion that is physically separated from the lower portion such that the upper portion is not in direct communication with the well; and
   a sand separation device coupled to and external from the wellhead device, wherein the sand separation device is configured to receive the mixed fluid from the well via the wellhead device, separate at least some solids from the mixed fluid to produce a separated fluid, and provide at least some of the separated fluid back to the wellhead device;
   a sand storage tank in communication with the sand separation device, wherein the sand storage tank is configured to receive the solids from the sand separation device;
   a bypass line extending from the sand storage tank; and
   a separator skid, wherein a recovered fluid from the sand storage tank flows through the bypass line and is combined with the separated fluid from the upper portion of the wellhead device to produce a combined fluid that is introduced to the separator skid.

2. The desanding wellhead of claim 1, wherein the sand separation device comprises a plurality of separators coupled to and at least partially supported from a ground by the wellhead device.

3. The desanding wellhead of claim 1, wherein the wellhead device comprises an inlet pipe connected to the well, a plurality of inlet valves, and a plurality of outlet valves, wherein the plurality of inlet valves fluidly communicate with the inlet pipe and are configured to control fluid delivered to the sand separation device, and wherein the plurality of outlet valves do not fluidly communicate with the inlet pipe and are configured to control a flow of fluid received from the sand separation device.

4. The desanding wellhead of claim 3, wherein the plurality of inlet valves and the plurality of outlet valves are coupled to and supported above a ground at least partially by the inlet pipe.

5. The desanding wellhead of claim 3, wherein the sand separation device comprises a plurality of cyclonic separators positioned around the inlet pipe, each having an inlet, a fluid outlet, and a solids outlet, the inlet of each of the cyclonic separators being coupled to a respective one of the plurality of inlet valves, and the fluid outlet of each of the cyclonic separators being coupled to a respective one of the plurality of outlet valves, the inlet of each of the cyclonic separators and the fluid outlet of each of the cyclonic separators being proximal to a top of the respective cyclonic separators.

6. The desanding wellhead of claim 5, further comprising a secondary separator, wherein the solids outlet of each of the cyclonic separators is coupled to the sand storage tank, and wherein the fluid outlet of each of the cyclonic separators is connected to the secondary separator via at least one of the plurality of outlet valves.

7. The desanding wellhead of claim 1, wherein the sand separation device is configured to receive the mixed fluid from the well via the lower portion, and to provide fluid separated from the mixed fluid to the upper portion.

8. The desanding wellhead of claim 1, wherein the bypass line extends from the sand storage tank to the wellhead device, an outlet of the wellhead device, or both, wherein the bypass line is configured to route the first fluid in the sand storage tank to the wellhead device or the outlet of the wellhead device.

9. The desanding wellhead of claim 8, wherein the sand separation device comprises a plurality of cyclonic separators that do not include individual collection chambers, but are coupled in parallel to the sand storage tank.

10. The desanding wellhead of claim 9, wherein sand from the plurality of cyclonic separators is carried to the sand storage tank in a slurry including the recovered fluid, wherein the recovered fluid is recovered from the sand storage tank via the bypass line.

11. The desanding wellhead of claim 10, wherein the recovered fluid recovered from the sand storage tank via the bypass line is combined with the separated fluid separated from the sand by the sand separation device.

12. The desanding wellhead of claim 9, wherein the wellhead device comprises a manifold that connects an inlet pipe of the wellhead device that is coupled to the well to the plurality of cyclonic separators, and wherein the manifold physically connects the plurality of cyclonic separators to the wellhead device, such that the wellhead device supports the plurality of cyclonic separators above a ground.

13. A desanding wellhead, comprising:
a wellhead device comprising a lower portion coupled to a well and configured to receive a mixed fluid produced therefrom, and an upper portion coupled to a wellhead outlet and configured to provide a separated fluid thereto; and one or more separators coupled to the wellhead device and physically supported thereby, the one or more separators being configured to receive the mixed fluid from the lower portion of the wellhead device, separate at least some solids from the mixed fluid to generate at least some of the separated fluid, and provide the separated fluid generated thereby to the upper portion of the wellhead device;

a sand storage tank in communication with the one or more separators, wherein the sand storage tank is configured to receive the solids that are separated from the mixed fluid by the one or more separators;

a bypass line extending from the sand storage tank; and a separator skid, wherein a recovered fluid from the sand storage tank flows through the bypass line and is combined with the separated fluid from the upper portion of the wellhead device to produce a combined fluid that is introduced to the separator skid.

14. The desanding wellhead of claim 13,
wherein the sand storage tank is coupled to a solids outlet of the one or more separators, such that a slurry of the solids and a first fluid are received from the one or more separators in the sand storage tank; and wherein the bypass line extends from the sand storage tank and into communication with the wellhead outlet, wherein the bypass line receives at least some of the recovered fluid in the sand storage tank, and wherein the recovered fluid received in the bypass line from the sand storage tank is combined with the separated fluid provided by the one or more separators.

15. The desanding wellhead of claim 14, wherein the bypass line is connected to at least one of the upper portion of the wellhead device or the wellhead outlet.

16. The desanding wellhead of claim 13, wherein the lower portion of the wellhead device comprises an inlet pipe extending vertically from a well, the one or more separators being supported from a ground at least partially by physical connection to the inlet pipe.

17. The desanding wellhead of claim 13, wherein the wellhead device comprises a plurality of inlet valves, a plurality of outlet valves, and a master valve positioned vertically between the plurality of inlet valves and the plurality of outlet valves, wherein the outlet valves are vertically above the inlet valves.

\* \* \* \* \*